Dec. 23, 1952    K. N. MILLS    2,622,699
GEAR CASE WITH MAGNETIC LUBRICANT PURIFYING MEANS
Filed Nov. 15, 1950
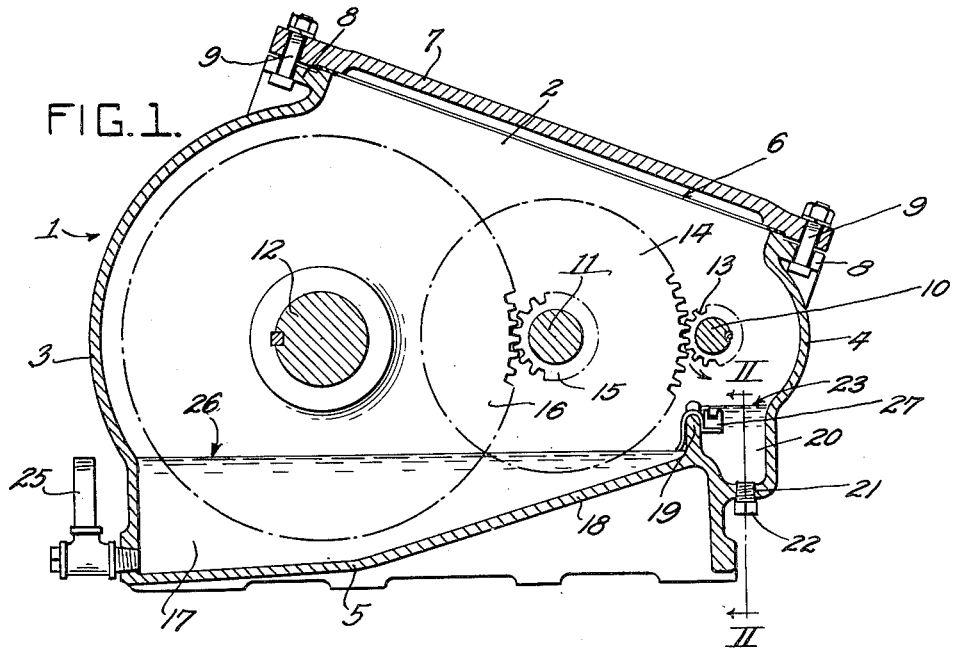
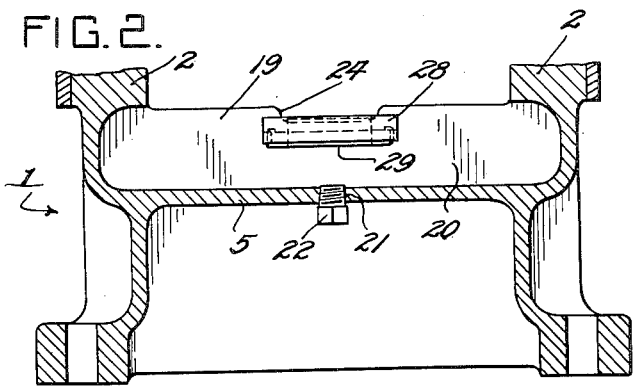
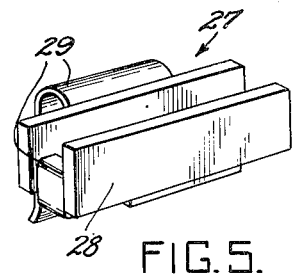
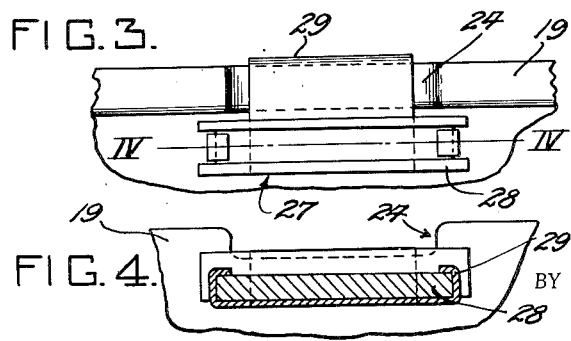
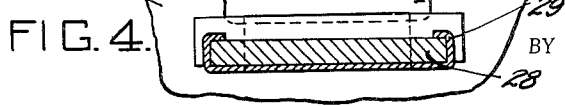
INVENTOR
Kenneth N. Mills
BY
W. S. McDowell
ATTORNEY Patented Dec. 23, 1952

2,622,699

UNITED STATES PATENT OFFICE 2,622,699

GEAR CASE WITH MAGNETIC LUBRICANT PURIFYING MEANS

Kenneth N. Mills, Columbus, Ohio, assignor to International Derrick and Equipment Company, Columbus, Ohio, a corporation of Ohio Application November 15, 1950, Serial No. 195,814

4 Claims. (Cl. 184—13)

This invention relates to lubricant-containing gear transmissions, particularly transmissions embodying housings formed with oil-receiving chambers and containing intermeshing gears immersed, at least in part, in the oil of said chambers, whereby to lubricate the gears.

The fluid lubricants present in such transmissions quite commonly contain small metallic particles formed as a result of use and wear of the gears and other moving parts. These particles are of such size as to circulate with or accumulate in the lubricant, the particles entering the shaft bearings of such transmissions and lodging between the teeth of intermeshing gears, causing excessive wear and damage to the operating parts of the transmission.

It is, therefore, the principal object of the present invention to provide improved means in the form of a permanent magnet immersed in the path of lubricant flow within the gear housing of a transmission, the magnet being located in a position enabling the same to directly contact or attract free metallic particles present in the lubricating oil, to the end of effecting adherence of the particles on said magnet, and thus facilitating convenient and effective removal of the undesired metallic particles from the oil and transmission housing.

I am aware that it has been proposed heretofore to remove metallic particles from lubricating oils in different types of mechanisms by the attraction of permanent magnets. In the present invention, this principle is utilized most efficiently in a speed-reducing gear transmission, and wherein a casing or housing is formed including in the bottom thereof a main oil-receiving chamber in which a body of oil is contained at such a level as to enable the gearing of the transmission to be partly immersed therein, the said chamber being separate from an associated sump chamber provided in the casing or housing at one end thereof and separated from the main oil chamber by a baffle wall or weir with which is detachably associated a permanent magnet, the latter being arranged in the path of travel of oil overflowing the baffle or weir in film formation to the main lubricant chamber, whereby to enable the magnet to function effectively in attracting metal particles contained in the overflowing oil.

The invention further provides a gear transmission of the character set forth in which the baffle wall employed in separating the main oil-containing chamber from the sump chamber is so disposed that the sump chamber will receive fluid lubricant thrown tangentially from the teeth of intermeshing gears mounted in connection with the power input shaft of the transmission. This arrangement enables the sump chamber, in the operation of the transmission, to accumulate a body of oil which attains a level higher than the level of oil present in the main lubricant-receiving chamber, the oil delivered to the sump chamber from the intermeshing gears containing in greater concentration the small iron particles or filings caught in the oil by the operation of the apparatus, whereby to enable the magnetic bar of the present invention, which is carried by the baffle wall and disposed preferably in said sump chamber, to function most effectively in attracting undesired particles of ferrous matter.

For a further understanding of the invention, reference is to be had to the following description and the accompanying drawing, wherein:

Fig. 1 is a vertical longitudinal sectional view taken through a gear transmission having the bottom thereof formed with a main oil-receiving chamber and an associated sump, with the chamber and sump separated by a baffle wall or weir carrying a permanent magnet formed in accordance with the present invention;

Fig. 2 is a vertical transverse sectional view taken through the sump chamber of the transmission housing on the plane disclosed by the line II—II of Fig. 1, and illustrating the magnet attached to the sump chamber side of a baffle wall or weir;

Fig. 3 is a fragmentary top plan view of the magnet in its mounted position on the baffle wall or weir;

Fig. 4 is a vertical sectional view taken on the line IV—IV of Fig. 3;

Fig. 5 is a detail perspective view of the magnet and holder of the present invention.

Referring to the drawing, the numeral 1 designates the casing or housing of a gear transmission, such as that employed in the driving of various heavy mechanical parts and in reducing the R. P. M. rate of a high speed motor shaft to the R. P. M. required of a driven shaft.

In this instance, the casing or housing 1 includes spaced vertical side walls 2, end walls 3 and 4 and a bottom wall 5. The top of the casing or housing is formed with an access opening 6 normally closed by a cover plate 7, the latter being detachably joined with seating flanges 8 through the medium of bolts or their equivalents 9.

Journaled in bearings, not shown, formed in connection with the side walls 2 are spaced parallel driving, intermediate and driven shafts 10, 11 and 12, respectively. In this instance, the driving shaft 10 may be connected with a source of power such as an electric motor, or the shaft of an internal combustion engine. The shaft 10 rotates at relatively high rates of speed, and to reduce this speed, such transmissions provide the shaft 10 with a pinion, shown at 13, the teeth of which mesh with an idler gear 14 rotatable with or about the intermediate shaft 11. The latter shaft is also equipped with a pinion 15, the teeth of which mesh with those of a relatively enlarged gear 16 fixed on the driven shaft 12.

To lubricate this typical gearing, the bottom 5 of the transmission housing or casing is formed with a main lubricant-receiving chamber 17, the latter having a relatively sharply sloping portion 18, the angle of which conforms to the circumference of the gears shown at 14 and 16. Beneath the driving shaft 10, the sloping wall 18 of the bottom 5 terminates in an upwardly projecting baffle which constitutes an end wall of the main lubricant-receiving chamber 17 of the housing. On the opposite side of the baffle 19, there is provided a sump or trap chamber 20 of comparatively small volumetric capacity as compared with the main chamber. The sump chamber may be provided in the bottom thereof with a discharge opening 21, normally closed by a removable threaded plug 22.

With the cover plate 7 removed, lubricating oil may be introduced into the chamber 17, filling the latter to the level indicated at 26, the cover plate may then be restored to its operative position closing the opening 6, as shown in Fig. 1, and the apparatus operated. As a result of the rotation of the power input shaft 10, and the gears 13 and 14 associated therewith, the fluid lubricant is thrown centrifugally or tangentially from the teeth of the intermeshing gears, causing the body of oil to collect in the chamber 20, filling the latter to the level indicated at 23. When this level is reached, the oil overflows through a weir notch or recess 24 formed in the upper edge of the baffle 19, as indicated in Fig. 2, the oil thus overflowing being delivered to the main lubricating chamber 16. At its forward or deeper end, this chamber includes an externally arranged standpipe 25. When oil flows from the upper end of the standpipe, the correct level of the oil, indicated at 26 in the drawings, is produced in the main chamber, the level 26 being normally below that of the level indicated at 23 in the trap chamber 20. The lower portions of the gears 14 and 16 are immersed in the oil contained in the chamber 17, assuring proper lubrication of the teeth of all the gears of the transmission or speed reducer.

In the operation of this transmission, the oil which accumulates in the sump or trap chamber 20, and which has been thrown from the teeth of the gears 13 and 14, contains the highest concentration of metal particles, since it is from the teeth of the gears that these metal particles are mainly formed. Therefore, to remove such metal particles from the oil, and to prevent the particles from deleteriously effecting the gearing, I employ an attachment in the form of a permanent magnet for the purpose of attracting and removing said particles in a positive and efficient manner. The magnet, indicated at 27, embodies in a preferred form a channel-shaped bar 28, which is carried by a sheet metal holder 29, the latter being detachably engaged with the edges of the weir notch 24 formed in the baffle 19 to support the magnetic bar in an advantageous operating position.

By this means, the magnet may be readily removed from time to time from the housing of the transmission. It will be noted that the magnet is arranged directly below the driving or high-speed shaft 10 of the transmission, thus occupying a position in which it is disposed to attract the maximum amount of metal particles or filings present in lubricating oil in the operation of the transmission. Moreover, the magnet when mounted occupies an elevated position, so that the lubricating oil flows over its metal-attracting surfaces in a film-like manner, thereby enabling the magnet to operate with maximum effectiveness in the lubricating oil of the system.

It will be understood from the foregoing description that when the particles of metal, worn or broken from the gears or other parts, fall into the lubricating liquid, they are attracted by the magnetic bar and adhere thereto, thus being prevented from being carried up between the gears or into the bearings of the transmission. Also, when the bar becomes covered with these metal particles, the latter can be easily and readily removed from the housing by removing the bar from the baffle wall with the particles clinging thereto, this feature being distinguished from such constructions as those in which the bar is stationarily positioned in the lubricating oil. The construction is simple, inexpensive and easy to apply to speed reducers and other gear-type transmissions.

I claim:

1. The combination with a gear transmission comprising a casing having bottom, side and end walls; driving, intermediate and driven shafts rotatably mounted in connection with the side walls of the casing; gears having intermeshing teeth mounted on each of said shafts; an upstanding baffle formed with the bottom wall of said casing and extending transversely thereof from one side wall to the other; said baffle providing the bottom wall of said casing on one side thereof with a main oil-receiving chamber and on its other side with a smaller oil-receiving sump chamber; said sump chamber being disposed in vertical registration with said driving shaft to receive oil discharged from the teeth of gears associated with said driving and intermediate shafts; the height of said baffle being such as to maintain the level of oil in the sump chamber in a plane above that of the oil in said main chamber; and a permanent magnet removably mounted in said sump chamber adjacent to the upper edge of said baffle to remove metal particles from oil overflowing the sump chamber into said main chamber.

2. In a gear transmission, a casing having a bottom formed with an upstanding baffle dividing the interior of the casing in the lower part thereof into main and sump chambers for the reception of lubricating oil, and a permanent magnet removably mounted in one of said chambers adjacent to the upper edge of said baffle to remove metal particles from oil overflowing the sump chamber into said main chamber.

3. In a gear transmission, a casing including bottom and side walls, an upstanding baffle arising from said bottom wall and joined at its ends with said side walls, said baffle separating the lower portion of said casing into main and sump lubricant-receiving chambers, the upper portion of said baffle being provided with a weir-forming recess providing for the overflow of oil from said sump chamber into said main chamber, and a permanent magnet carried by said baffle contiguous to the weir recess therein.

4. In a gear transmission, a casing including bottom and side walls, an upstanding baffle arising from said bottom wall and joined at its ends with said side walls, said baffle separating the lower portion of said casing into main and sump lubricant-receiving chambers, the upper portion of said baffle being provided with a weir-forming recess providing for the overflow of oil from said sump chamber into said main chamber, a permanent magnet of bar-shaped configuration, and means for removably mounting said magnet adjacent to said weir recess.

KENNETH N. MILLS.

REFERENCES CITED

The following references are of record in the file of this patent:

UNITED STATES PATENTS

| Number | Name | Date |
| --- | --- | --- |
| 2,191,962 | Jones | Feb. 27, 1940 |
| 2,329,893 | Girard | Sept. 21, 1943 |
| 2,436,740 | Brooks | Feb. 24, 1948 |
| 2,459,534 | Kennedy | Jan. 18, 1949 |